Figure 4:
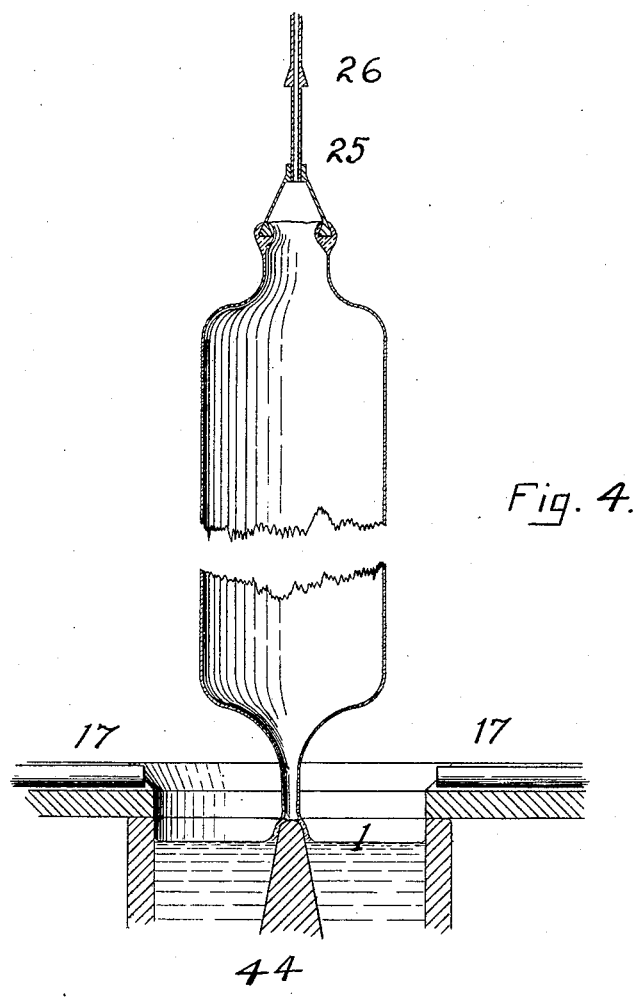

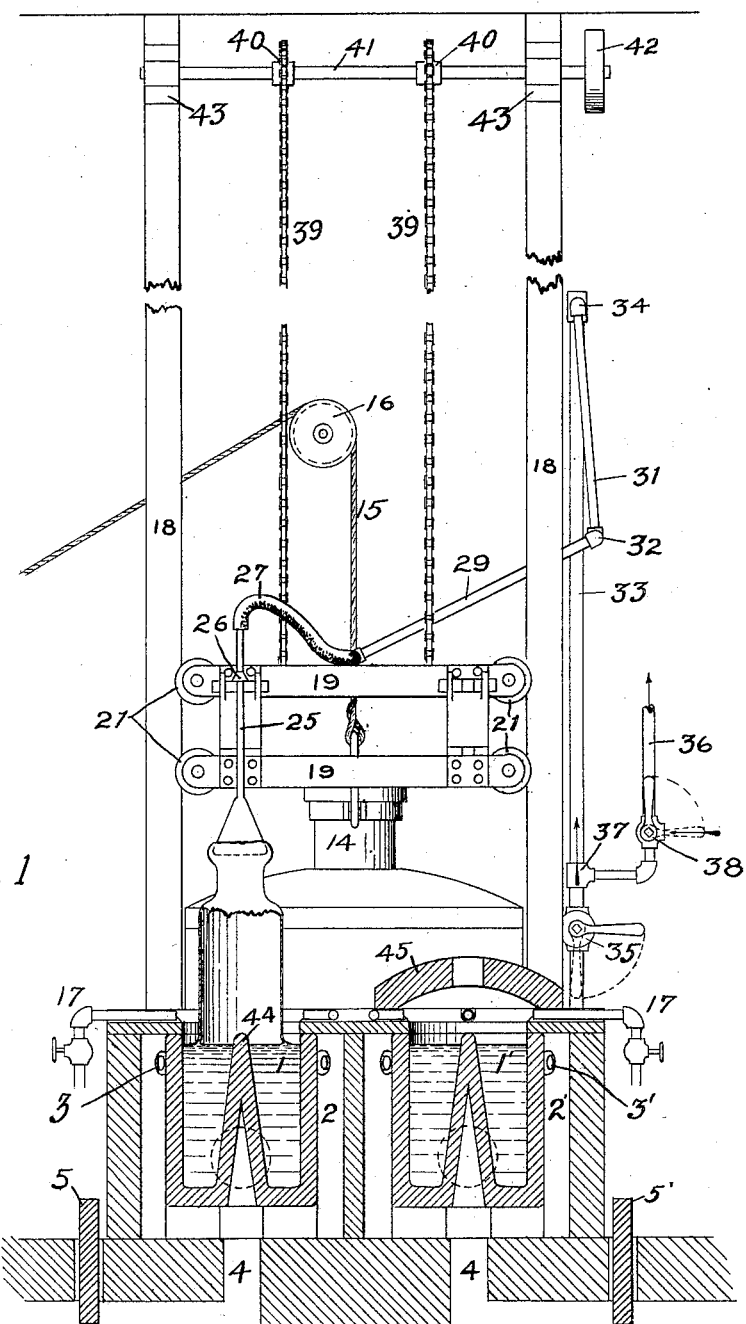

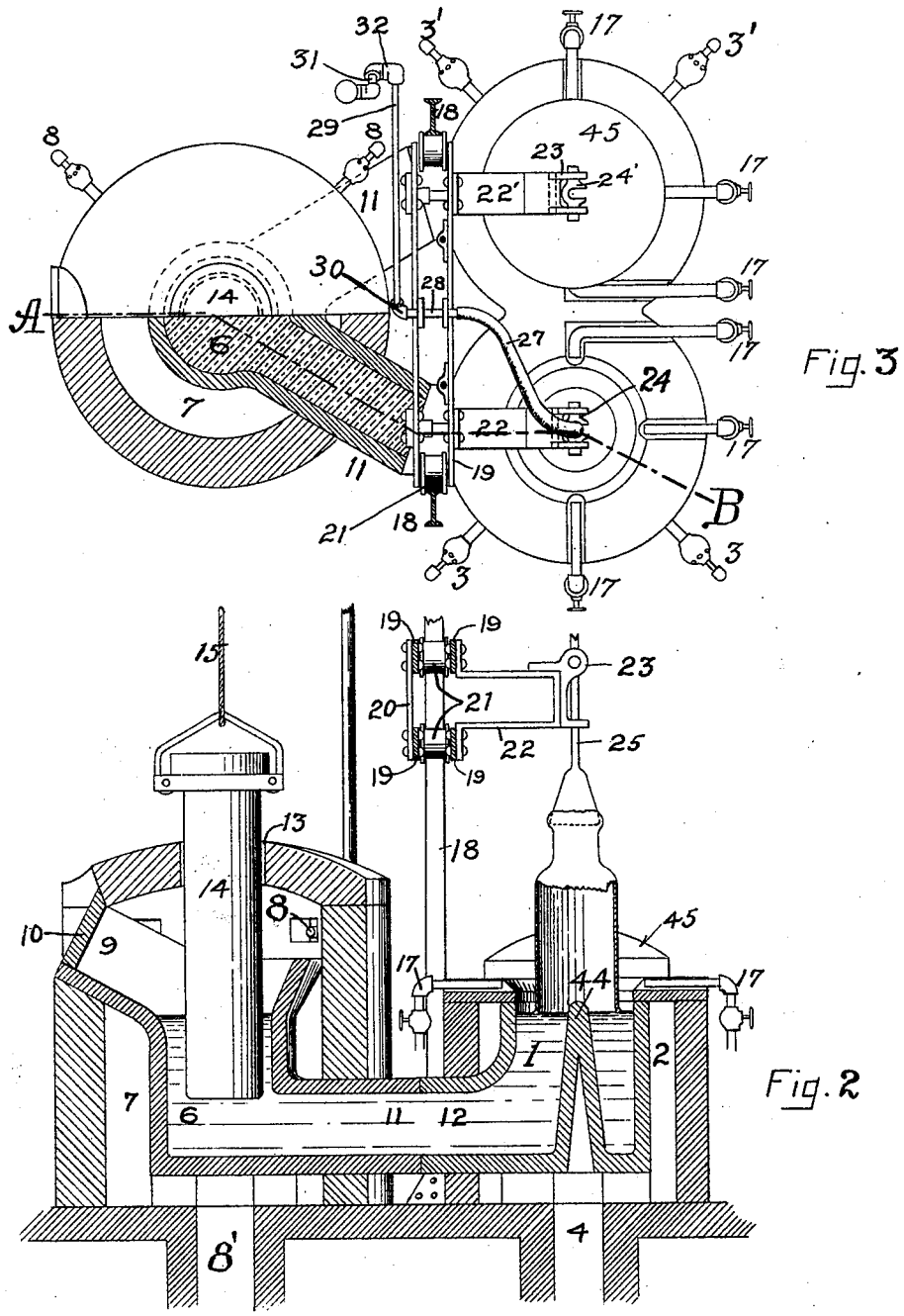

UNITED STATES PATENT OFFICE.

IRVING W. COLBURN AND CLIFTON W. IRWIN, OF FRANKLIN, PENNSYLVANIA; SAID IRWIN ASSIGNOR TO SAID COLBURN.

PROCESS AND APPARATUS FOR DRAWING GLASS.

No. 805,056.　　　Specification of Letters Patent.　　　Patented Nov. 21, 1905.

Application filed April 25, 1904. Serial No. 204,861.

*To all whom it may concern:*

Be it known that we, IRVING W. COLBURN and CLIFTON W. IRWIN, of Franklin, Pennsylvania, have invented a new and useful Process and Apparatus for Drawing Glass, which process is fully set forth in the following specification.

This invention relates to the art of glass-working, and more particularly to the art of drawing glass from receptacles or pots containing a supply of molten glass.

The particular exemplification of the invention hereinafter illustrated and described has reference to the drawing of cylinders of glass, which cylinders may be utilized in cylindrical form as drawn or may be split open and flattened out to form sheets of glass in ways well understood in the art; but it is to be particularly understood that many features of the invention are not limited to drawing cylinders, since they are equally applicable to the drawing of glass in sheets or other forms.

It has heretofore been proposed to draw cylinders of glass by dipping a cylindrical bait or mold into a bath of molten glass and then steadily elevating the bait and at the same time permitting air to enter the cylinder either under atmospheric or higher pressure, while the exterior of the cylinder at a point adjacent to the surface of the bath of molten glass is cooled by suitable means.

The present invention consists in improvements upon the method just described and the apparatus employed for carrying such method into effect.

Broadly stated, the improvements consist, first, in drawing a cylinder of glass from a mass of molten glass and simultaneously subjecting the interior of the cylinder while being drawn to a gradually-increasing pressure per unit of surface and maintaining the level of the mass of glass from which the cylinder is drawn approximately constant. This enables the workman to draw a cylinder which shall be uniform in diameter throughout its length and which shall be subjected to the cooling influence of the surrounding atmosphere or other cooling means at a constant distance above the surface of the molten mass from which the cylinder is drawn. This enables cylinders to be drawn under constant conditions, and therefore enables the workman to determine accurately beforehand the results to be obtained.

Second. The invention consists in drawing a cylinder of glass from a mass of molten glass whose upper or working surface is maintained approximately constant during the drawing operation, subjecting the interior of the cylinder to a gradually-increasing pressure per unit of surface during the drawing operation and at the terminal part of the drawing operation exhausting the pressure from the interior of the cylinder, preferably while subjecting the exterior of the cylinder to increased heat—as, for example, to the action of a series of jets of flame—thereby greatly facilitating the severance of the drawn cylinder from the molten mass in the working pot without fouling said mass of glass by permitting broken pieces of glass to fall into the molten mass in the act of severing the cylinder therefrom. The mass of molten glass may be maintained approximately level for the purpose indicated in the first and second statements of the invention above mentioned in any suitable manner, and, as herein shown, this is accomplished by providing a displacement-piece or weight which is lowered into the mass of molten glass with sufficient rapidity to compensate for the glass which is withdrawn in the act of forming a cylinder.

Third. The invention consists in providing a plurality of working chambers or pots in combination with the receiving or filling-in chamber or pot and its accompanying displacement-piece. One of the important advantages due to this arrangement lies in the fact that while a cylinder of glass is being drawn from one working chamber or pot, and thus exposing the glass in said pot to the cooling influence of the outside atmosphere, the other chamber or pot may be covered over and subjected to the proper heating agency for bringing the glass therein to the best condition for the drawing operation. The result of this is that instead of the workman having to wait for the glass in the chamber or pot from which the cylinder has just been drawn to reach the proper condition for drawing the next cylinder, he can immediately proceed to draw the subsequent cylinder from another working pot, while the glass in the previous chamber or pot is being heated so as to prepare it for another operation. This very largely increases the capacity of the machine.

Fourth. The invention further consists in providing the working chamber or pot containing the mass of molten glass with a body of refractory material located near the center of the working pot and around which the cylinder is drawn, the uppermost part of said body of refractory material preferably being formed with a conical point. This body of refractory material is rigidly positioned in the working pot, preferably in the center thereof, and by maintaining the working level of the mass of glass approximately constant during the drawing operation this conical point of refractory material will always project a constant distance above the mass of the molten glass from which the cylinder is being drawn. These provide means for readily severing the drawn cylinder from the mass of molten glass within the working pot, since by the present invention a cylinder while in the act of being drawn is distended to the desired diameter by means of internal pressure; but when the cylinder has reached the desired length the pressure is withdrawn from within the cylinder to such an extent as to create a partial vacuum therein, and upon continuing the drawing operation for a slight distance the pressure of the external atmosphere causes the cylinder to gradually collapse or draw inward at its lower end around the upwardly-projecting point of refractory material in the center of the pot, and the continuance of the drawing operation draws the cylinder off the point, any slightly-hardened glass that may remain clinging to the point of refractory material without fouling the surface of the molten mass within the pot, and when the pot is subsequently covered over and subjected to the proper heating influence this small amount of glass upon the refractory point is melted and runs down into the working pot without fouling the molten mass contained therein. Preferably the base of the cylinder is heated simultaneously with or just before the collapsing of the lower end or drawing the same to a point, so as to cause the base of the cylinder to draw very thin and easily draw off of the point. This in the present instance is accomplished by providing heating gas-jets located around the mouth of the working pot, so as to impinge upon the base of the cylinder immediately above the top of the point of refractory material projecting above the surface.

The invention further consists in certain details of construction and modes of operation which will be hereinafter described and then specifically pointed out in the claims.

The inventive idea involved may be embodied in a great variety of mechanical forms, one mechanical expression being contained in the construction shown in the accompanying drawings, in which—

Figure 1 is a transverse vertical section through a machine provided with two working pots, the section-line being taken through the two pots and the drawing apparatus being shown in broken front elevation. Fig. 2 is a vertical section taken on the line A B, Fig. 3. Fig. 3 is a plan view of the machine shown in Fig. 1, part being shown in horizontal transverse section; and Fig. 4 is a detail showing the method of drawing the cylinder off of the point of refractory material projecting above the surface of the molten glass.

Referring to the drawings which form part of this specification, and in which like numerals refer to like parts, 1 1' indicate the working pots, and 2 2' are the reheating-chambers surrounding said pots, heat being supplied to said chambers in any suitable way, as by gas-jets 3 3', while 4 4' are flues for taking off the products of combustion, which flues are controlled by suitable dampers 5 5'. The filling or receiving pot 6 is surrounded by heating-chamber 7, which chamber is supplied with heat from any suitable source, as by gas-burners 8, whose products of combustion are withdrawn through a suitable flue 8', Fig. 2, said filling or receiving pot being provided with a filling-opening 9, controlled by a suitable closure or stopper 10, and being connected to the working pots 1 1' by the conduits 11, registering with the conduits 12, leading to the working pots, the joint being outside of the heating-chambers, so that the plastic glass which inevitably escapes through the joint will become chilled and act as a seal for the joint, whereas if the joint were in the fire-box the glass would run through the crack and empty the pot into the fire-box.

Referring to Fig. 2, it will be observed that the receiving or filling-in pot 6 is provided with a cover, through which there is an opening 13, and through this opening 13 protrudes a weight 14, which practically fills the opening 13, but so as to work easily therein, provision being made for raising and lowering the weight by means of flexible cable 15, passing over a sheave 16. (Shown in Fig. 1.) This cable 15 may be operated in any suitable way, either automatically or manually, as may be desired.

Centrally located within the chambers or working pots 1 1' are upwardly-projecting masses of refractory material 44, which preferably taper to an approximately conical point or apex, which apex is located slightly above the desired working surface in the working pot. Each of the chambers or pots is provided around its opening or mouth with a series of gas jets or burners 17 for reheating the surface of the molten glass within the working pot and for softening the glass at the time when the lower end of the cylinder is to be severed from the mass of glass within the pot, and a cover 45 is provided for the working chamber or pot which is not in use, one of these covers being shown in position in Figs. 1, 2, and 3.

Located on opposite sides of the machine, and preferably slightly to the rear of the working chambers or pots, is a pair of upright ways 18 18, upon which a cross-head, composed of flat bars 19 19, suitably united together by cross-pieces 20, (see Fig. 2,) is arranged to travel, rollers 21 21 being provided to facilitate the movements upon the ways. Referring to Figs. 2 and 3, 22 represents bait-supports projecting outward from the cross-head 19, which supports are provided with a part 23 for receiving a tubular portion of the bait 25, which tubular bait is provided with an enlargement or shoulder 26, Fig. 1, which when the bait is in position rests upon the upper surface of the bait-supporting forks 24 24', Fig. 3, pivotally carried, as by trunnions, upon the bait-supports 22.

A piece of flexible tubing—as, for example, a hose 27—is separably connected to the upper end of the tubular bait 25 at one end, while the other end of said hose is connected to a pipe 28, Fig. 3, preferably located transversely to and near the center of the traveling cross-head 19, the other end of the pipe 28 being connected to the swinging pipe 29 by a flexible joint 30, while another portion or swinging pipe 31 is connected to pipe 29 by a flexible joint 32 at one end and at the other end is connected by a flexible joint 34 to a stationary pipe 33. This pipe 33 is controlled by a valve or cock 35, provided with a suitable handle for operating it to open or close the passage through the pipe. The pipe 33 extends to a source of fluid-pressure and is provided with a suitable means for regulating the amount of pressure per unit of surface passing through the pipe to the cylinder being drawn.

In addition to the valve 35 and the regulating devices above mentioned there is connected to the pipe 33 another pipe 36, leading to an exhausting or suction apparatus, (not shown,) this pipe 36 being connected to the pipe 33 by the T-joint 37, said pipe also having introduced therein a three-way cock 38 so constructed that the cock may be turned to open the pipe 36 to the atmosphere or close it to the atmosphere and open a direct passage through the pipe, as may be desired. The cross-head constitutes a drawing-carriage, and means are provided for reciprocating it upon the ways 18, such means here being shown in the form of sprocket-chains 39, passing over sprocket-wheels 40 upon shaft 41, driven by a pulley 42, to which a belt extending to any suitable source of power is applied, the shaft 41 having bearings 43 in the uprights 18, all as will be readily understood from an inspection of Fig. 1.

Operation: Previous to starting the device into operation molten glass is poured into the filling-in or receiving pot 6, the displacement-weight 14 being raised high enough to be out of the glass when the surface thereof is at the proper working level in the working pot 1 1'. The molten glass being brought into proper condition to work, one of the covers 45 is removed from over its working pot, and the tubular bait 25 is then hung in the fork 24 where it is sustained by the enlargement 26, and the flexible hose is attached thereto. The bait having been previously heated, so that plastic glass will adhere thereto, it is lowered into the body of the molten glass, the bait being large enough to pass over the central projection 44, preferably without contact therewith. The shaft 41 being rotated to lift the bait-carriage, a neck is first formed by the upward drawing of the glass, the air being admitted to suit the conditions by the regulating-valve 35. When the neck is formed, the carriage is preferably stopped to allow the neck portion to chill in order to prevent its blowing out. The carriage is again started and continues its steady and uniform movement, and the air is admitted through the regulating-valve 35 with increased pressure to swell the cylinder out to the desired diameter. The operator will be enabled, through the use of the regulating-valve, to so control the internal air-pressure as to maintain the cylinder at substantially the same diameter throughout the drawing action. The cylinder being drawn to the desired length, air-pressure is shut off by closing valve 35, and the suction-valve 38 is turned, so as to close the pipe to the external atmosphere at the valve and open the suction-pipe directly into the pipe 33 and thence to the interior of the cylinder. The burners 17 are lighted, and the glass being thereby highly heated at the bottom of the cylinder the latter will draw to a point around the refractory projection 44, as shown in Fig. 4. This central refractory point 44 being just above the level of the molten glass in the pot, the lower end of the cylinder will first draw to it and will then pull off from it, the glass being drawn very thin, so that it will readily be melted off by the flames from the burner 17, or, if desired, it may be cut off with a pair of shears or cracked off with a cold iron, thus severing the lower end of the cylinder. By utilizing this means of severing the cylinder from the mass of the molten glass the surface of the glass within the working pot is left in good condition for the drawing of another cylinder, as the small portion of thin glass which is left from the cylinder remains upon the projecting point 44 and readily melts off and runs down into the mass of molten glass without fouling the surface thereof. When the cylinder is thus detached, the carriage is allowed to travel high enough to clear the lower end of the cylinder from the top of the heating-chamber, after which a fork or curved rod is applied to the lower end of the cylinder and it is swung outward, the bait is elevated out of its support, and the cylinder is laid horizontally or otherwise upon suitable supports. The bait may then be separated from the cylinder by cracking the neck portion in any suitable manner when the cylinder is ready for the operation of splitting and flattening into sheet form according to the well-known methods. In the meantime the cover 45 is removed from the pot that was idle during the drawing operation and is placed over the one from which the cylinder has just been drawn, and another bait being hung upon the support over the working pot thus opened the operation may be immediately repeated. During the operation the displacement-weight 14 is lowered into the receiving-chamber at a sufficient rate to maintain the level of the glass at the desired height in the working pot. While it is preferred to thus maintain the glass at a constant working level in the working pot during the process of drawing the cylinder, it will of course be apparent that a cylinder could be drawn from the working pot without thus lowering the weight, though this would not be deemed as advantageous as to maintain the surface of the molten glass at a constant level during the drawing operation. It will of course be understood that while a cylinder is being drawn from one working pot the burners 17 are lighted in the other working pot and the cover 45 is in place thereon, so as to maintain the glass in the idle working pot in a proper working condition.

What is claimed is—

1. In a glass-drawing apparatus, a receiving pot or chamber, a plurality of stationary working pots, independent conduits connecting said receiving-pot with each of said working pots, and a single glass-drawing apparatus capable of drawing glass from more than one of said working pots.

2. In a glass-drawing apparatus, a receiving pot or chamber, a plurality of stationary working pots, independent conduits connecting said receiving-pot with each of said working pots, means for drawing a cylinder of glass from said working pots, and a rigid body of refractory material within the cylinder and projecting above the surface of the molten glass in each pot.

3. In a glass-drawing apparatus, a receiving pot or chamber, a plurality of working pots, independent conduits connecting said receiving-pot with each of said working pots, a rigid body of refractory material projecting above the mass of molten glass in each of said working pots, and means maintaining the glass during the drawing operation at an approximately constant level within the working pots.

4. In a glass-drawing apparatus, a receiving pot or chamber, a plurality of working pots communicating therewith, a rigid body of refractory material projecting above and within the area of the working surface of the molten glass within each of said pots, and means for applying heat to the projecting point or portion of said refractory material.

5. In glass-drawing apparatus, a receiving pot or chamber, a plurality of working pots communicating therewith, a rigid body of refractory material projecting above the mass of molten glass at the approximate center of said pots, means for maintaining the glass approximately level in the pots during the drawing operation, and means for applying heat to the projecting points or portions of said refractory material.

6. In glass-drawing apparatus, the combination of a receiving chamber or pot, a plurality of working pots communicating therewith, a rigid body of refractory material projecting above and within the working surface of the molten glass in each of said pots, means for covering said working pots when the cylinder is not being drawn therefrom and heat-producing means between said covering means and the working level of the glass.

7. In glass-drawing apparatus, a receiving pot or chamber, a plurality of working pots communicating therewith, a single glass-drawing apparatus capable of drawing a cylinder of glass from more than one of said pots, and means maintaining the glass during the drawing operation at a constant level in the pot from which the cylinder is being drawn.

8. In glass-drawing apparatus, a receiving pot or chamber, a plurality of working pots communicating therewith, independent heating means for said receiving and working pots, means for drawing a cylinder of glass from one of said pots, means maintaining the glass during the drawing operation at a constant level in the pot from which the cylinder is being drawn, and means for supplying fluid-pressure to the interior of the cylinder during the drawing operation.

9. In a glass-drawing apparatus, the combination of a receiving-chamber for the molten glass, a plurality of working pots communicating therewith, means for drawing a cylinder of glass from one of said working pots, and a displacement element in said receiving-chamber for maintaining the molten glass at an approximately constant level in the working pots during the drawing operation.

10. In a glass-drawing apparatus, the combination of a receiving-chamber provided with a filling-in opening, a plurality of working pots communicating with said chamber, a displacement element in said chamber, a centrally-located refractory body projecting above the surface of the molten glass in each working pot, means for drawing a cylinder of glass from either of said working pots, and an exhaust-pipe separably connected to the interior of said cylinder.

11. In glass-drawing apparatus, the combination of a plurality of stationary working pots for molten glass, a single glass-drawing device capable of drawing glass from more than one of said pots, and means for heating said pots.

12. In glass-drawing apparatus, the combination of a plurality of working pots for molten glass, separate heating-chambers for each pot, a single glass-drawing device capable of drawing glass from more than one of said pots, and a filling or receiving pot communicating with said working pots.

13. In glass-drawing apparatus, the combination of a plurality of working pots for molten glass, a single filling or receiving pot, separate conduits leading from said filling or receiving pot to the working pots, separate fire-boxes or heating-chambers for each of the receiving and working pots, and a glass-drawing device associated with the working pots.

14. In glass-drawing apparatus, the combination of a plurality of working pots, a receiving or filling pot, separate fire-boxes or heating-chambers for each of said pots, conduits leading from the receiving-pot and registering or joining with like conduits leading to the separate working pots, the connecting-joints for said conduits being exterior to the fire-boxes, and a glass-drawing device associated with said working pots.

15. In glass-drawing apparatus, the combination of a working pot, a receiving or filling pot, separate fire-boxes or heating-chambers for each pot, a conduit leading from the receiving-pot and registering or joining with a like conduit leading to the working pot, the connecting-joint for said conduits being exterior to the fire-boxes, and a glass-drawing device associated with said working pot.

16. In glass-working apparatus, the combination of a plurality of receptacles for molten glass, separate fire-boxes or heating-chambers for each receptacle, and jointed conduits connecting two or more of said receptacles, the joints in said conduits being exterior to the fire-boxes or heating-chambers.

17. In glass-drawing apparatus, the combination of a working pot, a centrally-located point of refractory material projecting above the working level of the molten glass in said pot, a filling or receiving chamber or pot communicating with said working pot, means for maintaining the level of the molten glass during the drawing operation near to but not above the said refractory point, means for drawing a cylinder from said working pot, and an exhaust-conduit connected to the interior of said cylinder at the close of the drawing operation.

18. The improvement in the art of glass-working which consists in drawing a cylinder of glass from a mass of molten glass, subjecting the cylinder to internal pressure during the drawing operation, maintaining the level of the molten mass approximately constant while the cylinder is being drawn, and exhausting the pressure from the cylinder at the close of the operation.

19. The improvement in the art of glass-working which consists in providing a plurality of connected masses of molten glass, drawing a cylinder of glass from one of said masses, simultaneously subjecting the other mass to displacement whereby the level of the molten mass from which the cylinder is drawn will remain approximately constant, reducing the internal pressure below atmospheric pressure at the close of the drawing operation, and simultaneously applying a heating-flame to the lower end of the cylinder.

20. The improvement in the art of glass-working which consists in providing a plurality of connected masses of molten glass, drawing a cylinder of glass from one of said masses with gradually-increasing internal pressure during the drawing operation, subjecting the other mass to displacement whereby the level of the molten mass from which the cylinder is drawn will remain approximately constant, subjecting the lower end of the drawn cylinder to a heating-flame, and then drawing said cylinder free from the molten mass.

21. The improvement in the art of glass-working which consists in providing a plurality of connected masses of molten glass, drawing a cylinder of glass from one of said masses, subjecting the other mass to displacement whereby the level of the molten mass from which the cylinder is drawn will remain approximately constant, and severing the drawn cylinder from the molten mass by subjecting its lower end to the action of a flame and producing a variation between external and internal pressure while continuing the drawing operation.

22. The improvement in the art of glass-working which consists in providing a plurality of connected masses of molten glass, subjecting each of said masses separately to the action of heat, drawing a cylinder of glass from one of said masses and maintaining the working level of the glass by displacing one of the other masses during the drawing operation.

23. The improvement in the art of glass-working which consists in providing a plurality of connected masses of molten glass, drawing a cylinder of glass from one mass and maintaining the working level of the glass by displacing one of the other masses during the drawing operation.

In testimony whereof we have signed this specification in the presence of two subscribing witnesses.

IRVING W. COLBURN.
CLIFTON W. IRWIN.

Witnesses:
E. WASHBURN,
THOMAS McGOUGH.